Jan. 5, 1965    A. W. SCHNICK    3,163,924
METHOD OF MAKING A HEATING UNIT
Filed Sept. 14, 1961

INVENTOR
ARTHUR W. SCHNICK
BY
ATTORNEY

United States Patent Office 3,163,924
Patented Jan. 5, 1965

3,163,924
METHOD OF MAKING A HEATING UNIT
Arthur W. Schnick, Meriden, Conn., assignor to American Machine & Foundry Company, a corporation of New Jersey
Filed Sept. 14, 1961, Ser. No. 138,035
2 Claims. (Cl. 29—155.62)

This invention relates to electric cigar lighters such as are commonly used on automobiles and, in particular, it concerns the heating elements thereof.

Such elements are commonly wound in the form of a nominally flat spiral of resistance ribbon. The inner end of the ribbon is usually fitted and welded within a slot in a rivet serving as both a terminal for the element and as a structural member in the lighter assembly, while the outer end of the element is resistance welded to the wall of a metallic cup within which it is housed and which serves as its other terminal.

In practice it is highly desirable to have, on one hand, the heating element centered within its cup and, on the other hand, to have as much room as possible between the outer end of the element and the next preceding course, to permit easy entry of an electrode with which to weld the element to the cup wall. But, as the courses are preferably wound to substantially fill the cup, the room available for the entrance of a welding electrode is quite small and also, as the ribbon from which such elements are made is usually only about .008" to .012" thick x .062" wide (at least 12 volt service) and is quite springy, the combination of these desiderata are not easily attained. It is also most important to be able to test the weld between the element and the cup wall in order to insure satisfactory performance of the light. Such testing involves the straining of the ribbon near the weld and frequently so distorts the ribbon that the element is badly thrown off center, causing uneven spacing of the coils and premature failure by burn-out, unless corrected by expensive manipulation.

One object of this invention is to so shape the heating element as to positively ensure the maximum space for entry of a welding electrode, and to do so without permanent influence on the spacing of the courses.

A further object is to afford means wherewith the strength of the weld between the heating element and the surrounding cup wall may be tested.

Another object is to provide simple means whereby the occurrence of such testing is automatically demonstrated for inspection purposes.

A complete description of the present invention follows. From it the advantages and objects noted above, as well as others, will become apparent. In the description, reference is made to the accompanying drawings where:

Figure 1:
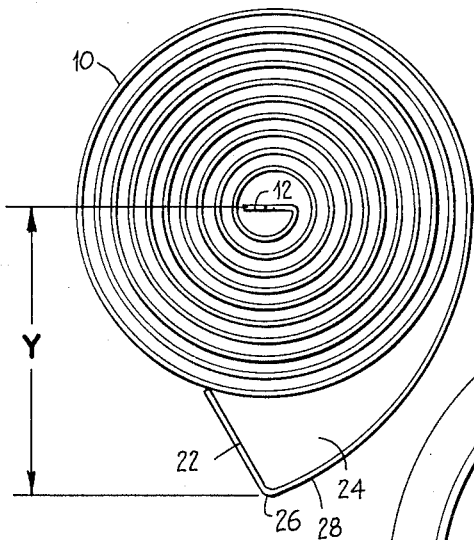
FIG. 1 is a plan view of a heating element, incorporating the invention, prior to insertion in the heating element cup.
Figure 2:
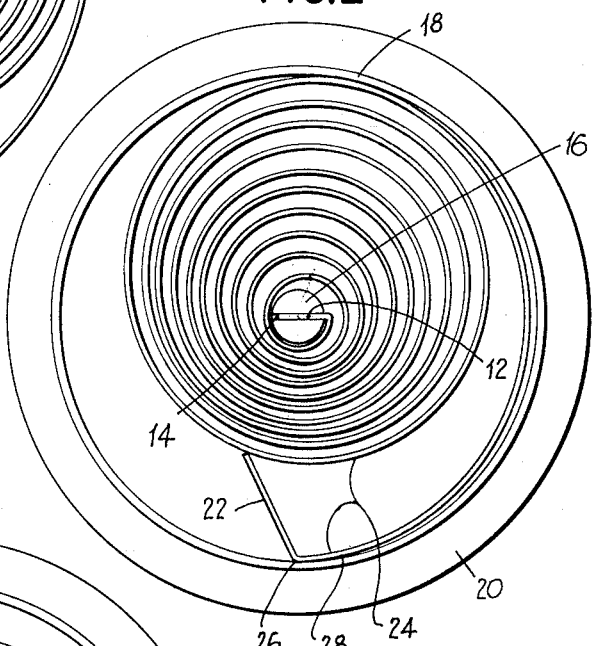
FIG. 2 is an end view of a cigar lighter with the heating element of FIG. 1 in situ, and ready for the outer end to be welded to the heating element cup.

With reference to the figures, the heating element 10 is coiled into a nominally flat spiral with its inner end 12 shaped substantially as shown to fit the slot 14 in the rivet 16 (FIG. 2) which secures the heating element cup 18 to the body of the lighter (a portion of which is shown at 20 in FIG. 3), all of which is well-known to those skilled in the art. However, instead of terminating the coiling at the outer end in a tangent portion or in merely a continuation of the normal curvature as is commonly done, the extremity or tip 22 of the outermost course is bent inwardly in accordance with this invention as shown in FIG. 1 so that it bears on the last previous course and by springing the turns of the ribbon open as shown, affords a relatively large space 24 between the tip 22 of the ribbon 10 and the next preceding course. A "knuckle" 26 providing a length of ribbon 28 shaped for welding to that of cup 18 also results from the bending process. Preferably the tip 22 is so proportioned that the dimension Y of FIG. 1 will be somewhat greater than one half of the inside diameter of the heating unit cup 18. It has been found that for greatest manufacturing convenience in conventional lighters, employing an approximately .700" diameter heating unit cup, the difference between these dimenisons should be such that the sum of space 24 plus the thicknesses of resistance metal lying within the dimension Y will approximate the one half diameter mentioned. These proportions afford the greatest space 24. It has also been found that it is preferable if the tip 22 lies at approximately 45° to a radius drawn from the center of the heating unit 10 to knuckle 26. It should be understood that the actual values of these dimensions and proportions may vary considerably from those given above and that they should be individually determined for each of the various cup diameters and resistance ribbon thicknesses and spring tempers used. The tip 22 should, however, be oriented so that it can "skid," without digging in, on the next inner course when radial pressure is applied. The purpose in providing this arrangement of "knuckle" 26 and inwardly bent tip 22 will become clear from the following discussion. When the heating element, proportioned substantially as disclosed above, is being assembled to the lighter it is manipulated so that first the knuckle 26 comes into contact with the inner wall of the heating element cup 18 and the element is next sprung so that its inner end 12 may enter slot 14 of rivet 16. If, at this stage, space 24 is too large it will be automatically corrected as the courses between it and the center of the element engage each other and the resulting pressure deflects the tip 22 a requisite amount. When this is done, the appearance of the parts will be substantially as shown in FIG. 2 and the space 24 will be greater than can be obtained in any other of the conventional ways. It is thus obvious that the space 24 facilitates the entrance of an electrode wherewith to resistance weld the length 28 to the wall of the heating unit cup 18 as shown at 30 in FIG. 3, tip 22 also aids in locating the element relative to the welding electrodes, thus assuring uniformity of weld location along the length 28.

Figure 3:
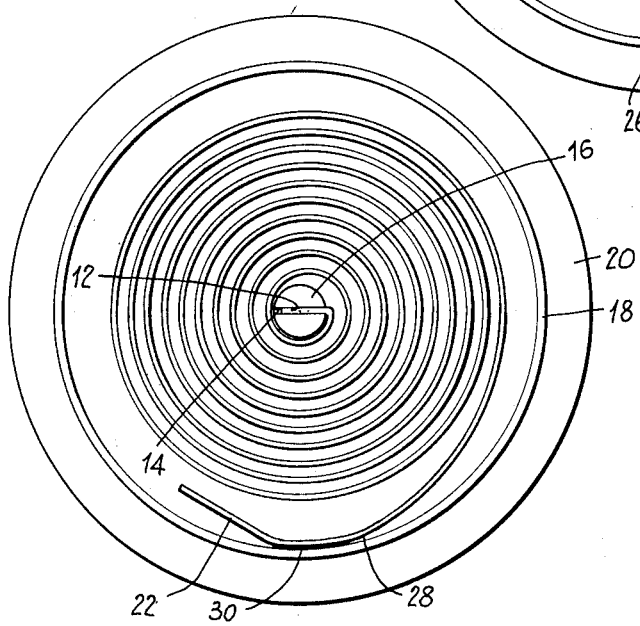
FIG. 3 is similar to FIG. 2 but showing the appearance of the element after welding in place and after the weld has been tested.

On completion of the welding operations, the appearance of the element will be practically unchanged. The weld 30 between the heating element cup 18 and the element at length 28 may now be tested by bending the tip 22 radially outward toward the wall of the cup 18 to a position such as is shown in FIG. 3. The bending, which may readily be accomplished by pressure exerted manually through any convenient tool such as a small blade or pick, exerts a turning moment about the weld 30, which would be counter-clockwise with parts arranged as shown in FIGS. 2 and 3. This turning moment is most adequate to test the weld; those welds which are too weak to afford satisfactory results in service will break during the bending of tip 22.

As the bending of tip 22 progresses, the inward radial pressure which it had exerted on the courses will be relieved and, by virtue of the springiness of the metal, the element 10 will assume an evenly centered position. The extent of this automatic centering moment may be controlled, at least in some part, by the degree of bending done to tip 22.

As the weld is automatically tested when the tip 22 is bent radially outwardly, the mere fact that the heating element, where the invention is employed, is properly centered in its cup affords visual evidence that a satisfactory weld has been made. Visual inspection will then be sufficient to determine a "good" from a "bad" lighter.

It is common commercial practice to make heating elements of the general type here described on automatic machines. With the present invention, it remains possible to make heating elements at a most negligible increase in cost which will afford overall increased performance resulting in great economic advantage by merely facilitating the automatic assembly through simplified testing and inspection.

I claim:

1. A method of making a heating unit for an electric cigar lighter comprising the steps of winding into a substantially flat spiral coil a metallic ribbon, turning the outer extremity of said coil inwardly from the general direction of said spiral, permitting the outermost tip of said extremity to bear on the next preceding course of said spiral so as to radially extend the outer course from said spiral, inserting said coil in a retainer cup so that the said outer course engages the inner side of said cup, welding said outer course to said retainer cup and turning said outermost coil extremity in a radially outward direction from its contact with said coil.

2. A method of making a heating unit for an electric cigar lighter comprising the steps of winding a metallic ribbon into a substantially flat spiral coil, bending the outer extremity of said coil inwardly from the general direction of said spiral, causing the outermost tip of said extremity to bear on the next preceding course of said spiral so as to deform said spiral and separate the outer course therefrom, inserting said coil in a retainer cup so that the said outer course engages the inner side of said cup, welding said outer course adjacent the bend therein to said retainer cup and then bending said extremity in a radially outward direction from its contact with said coil, allowing the coil to resume a substantially normal spiral position.

References Cited in the file of this patent
UNITED STATES PATENTS

| | | |
|---|---|---|
| 1,806,188 | Adams | May 19, 1931 |
| 1,944,922 | Cohen | Jan. 30, 1934 |
| 2,062,701 | Cohen | Dec. 1, 1936 |
| 2,464,147 | Myers | Mar. 8, 1949 |
| 2,873,509 | Sorber | Feb. 17, 1959 |
| 2,936,358 | Heusser | May 10, 1960 |
| 2,937,866 | Rogerson | May 24, 1960 |